US008699990B2

(12) United States Patent
Bussan et al.

(10) Patent No.: US 8,699,990 B2
(45) Date of Patent: Apr. 15, 2014

(54) LOCATION REQUESTS AND MEASUREMENT RESPONSES IN WIRELESS COMMUNICATIONS NETWORKS AND METHODS

(75) Inventors: Christopher F. Bussan, Crystal Lake, IL (US); Eric J. Hefner, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 3519 days.

(21) Appl. No.: 10/386,346

(22) Filed: Mar. 11, 2003

(65) Prior Publication Data
US 2004/0180645 A1    Sep. 16, 2004

(51) Int. Cl.
*H04M 11/04*    (2006.01)

(52) U.S. Cl.
USPC .................................................... 455/404.2

(58) Field of Classification Search
USPC ............. 455/456.1, 456.5, 456.2, 456.3, 437, 455/67.11, 436, 404.2, 404.1, 522, 456.6; 342/375.1, 375.6, 357.06; 370/335
See application file for complete search history.

(56) References Cited

U.S. PATENT DOCUMENTS

| | | | | |
|---|---|---|---|---|
| 5,042,082 A | * | 8/1991 | Dahlin | 455/437 |
| 5,883,810 A | | 3/1999 | Franklin et al. | |
| 6,000,832 A | | 12/1999 | Franklin et al. | |
| 6,049,711 A | | 4/2000 | Ben-Yehezkel et al. | |
| 6,097,958 A | | 8/2000 | Bergen | |
| 6,216,007 B1 | * | 4/2001 | Havinis et al. | 455/456.2 |
| 6,252,543 B1 | * | 6/2001 | Camp | 342/357.06 |
| 6,295,454 B1 | * | 9/2001 | Havinis et al. | 455/456.3 |
| 6,442,393 B1 | * | 8/2002 | Hogan | 455/456.5 |
| 6,671,266 B1 | * | 12/2003 | Moon et al. | 370/342 |
| 6,677,895 B1 | * | 1/2004 | Holt | 342/357.1 |
| 6,728,545 B1 | * | 4/2004 | Belcea | 455/456.2 |
| 6,757,545 B2 | * | 6/2004 | Nowak et al. | 455/456.2 |
| 6,856,805 B1 | * | 2/2005 | Raaf | 455/436 |
| 6,950,663 B2 | * | 9/2005 | Pihl et al. | 455/456.5 |
| 2002/0193121 A1 | | 12/2002 | Nowak et al. | |
| 2003/0017833 A1 | * | 1/2003 | Forrester | 455/456 |
| 2004/0192330 A1 | * | 9/2004 | Gaal | 455/456.1 |

FOREIGN PATENT DOCUMENTS

| | | |
|---|---|---|
| CN | 1309775 A | 8/2001 |
| EP | 1253438 A2 | 10/2002 |
| EP | 1229346 B1 | 6/2004 |
| WO | 980988 | 1/1998 |
| WO | 9961934 A | 12/1999 |

OTHER PUBLICATIONS

Korea: KIPO'S Notice of Preliminary Rejection, Aug. 31, 2010, 6 pages.
EPC Supplementary European Search Report, Munich Germany, Jul. 6, 2011, all pages.

* cited by examiner

*Primary Examiner* — Kiet Doan

(57) ABSTRACT

A method for requesting location information, for example, Enhanced Observed Time of Arrival timing information, from mobile wireless communications in wireless communications networks. The exemplary location request (300) includes multiple response interval field (310) specifying intervals at which multiple responses to the location request must be sent or maximum intervals between which multiple responses to the location request must be sent, a final response time field (320) specifying a maximum time interval during which a final response to the location request must be sent, and an initial response time field (330) specifying when an initial response to the location request must be sent.

4 Claims, 5 Drawing Sheets

LOCATION REQUESTS AND MEASUREMENT RESPONSES IN WIRELESS COMMUNICATIONS NETWORKS AND METHODS

FIELD OF THE DISCLOSURE

The present disclosure relates generally to wireless communications, and more particularly to location requests and responses, for example, network originated Enhanced Observed Time Difference (E-OTD) location requests and subscriber device E-OTD measurement responses, in wireless communications networks and methods therefor.

BACKGROUND

Some Enhanced Observed Time Difference (E-OTD) location technology architectures initiate E-OTD measurements in cellular subscriber devices by sending a location request from wireless communications networks to subscriber devices. For example, network requests for location information from subscriber devices are made during E-911 calls initiated by subscriber devices. Network location requests are also made in response to inquiries from subscriber devices for location-based services.

E-OTD location requests from networks typically include a list of assistance cells from which a subscriber device must attempt to obtain timing measurements. The assistance cell list is generally different from the list of neighbor cells monitored by the subscriber device for handover procedures.

Generally, the greater the number of cells on which measurements are made by the subscriber device in response to a location request, the better the accuracy of the location computation. However, the network must provide the subscriber device with a relatively short list of assistance cells, since the subscriber device must respond to the location request within a specified time period. Thus it is desirable for the network to accurately identify assistance cells on which the subscriber device will most likely obtain measurement data. Presently, the network selects the assistance cells based on a rough location estimate of the subscriber device. The rough location estimation is derived generally from timing advance and from sector or cell identification information.

Also, presently, networks must specify a response time without any knowledge of the radio conditions experienced by the subscriber device to which the location request is sent. Propagation delay of the network location request through the network is significant relative to the time period during which the subscriber device must perform the requested timing measurements. Similarly, the time required for the measurement information response to propagate from the subscriber device back to the network location server is not insignificant. The propagation delay generally increases the time required to locate the subscriber device.

Upon receipt of a response from a subscriber device, the network must determine the position of the subscriber device using measurement data from a single response of the subscriber device, since the network accepts only a single subscriber device response to the network location request. Thus the network computes the location of the subscriber device based upon assumptions, which may be inaccurate, and without any indication of E-OTD measurement trends.

The various aspects, features and advantages of the present disclosure will become more fully apparent to those having ordinary skill in the art upon careful consideration of the following Detailed Description and the accompanying drawings described below.

DETAILED DESCRIPTION

Figure 1:
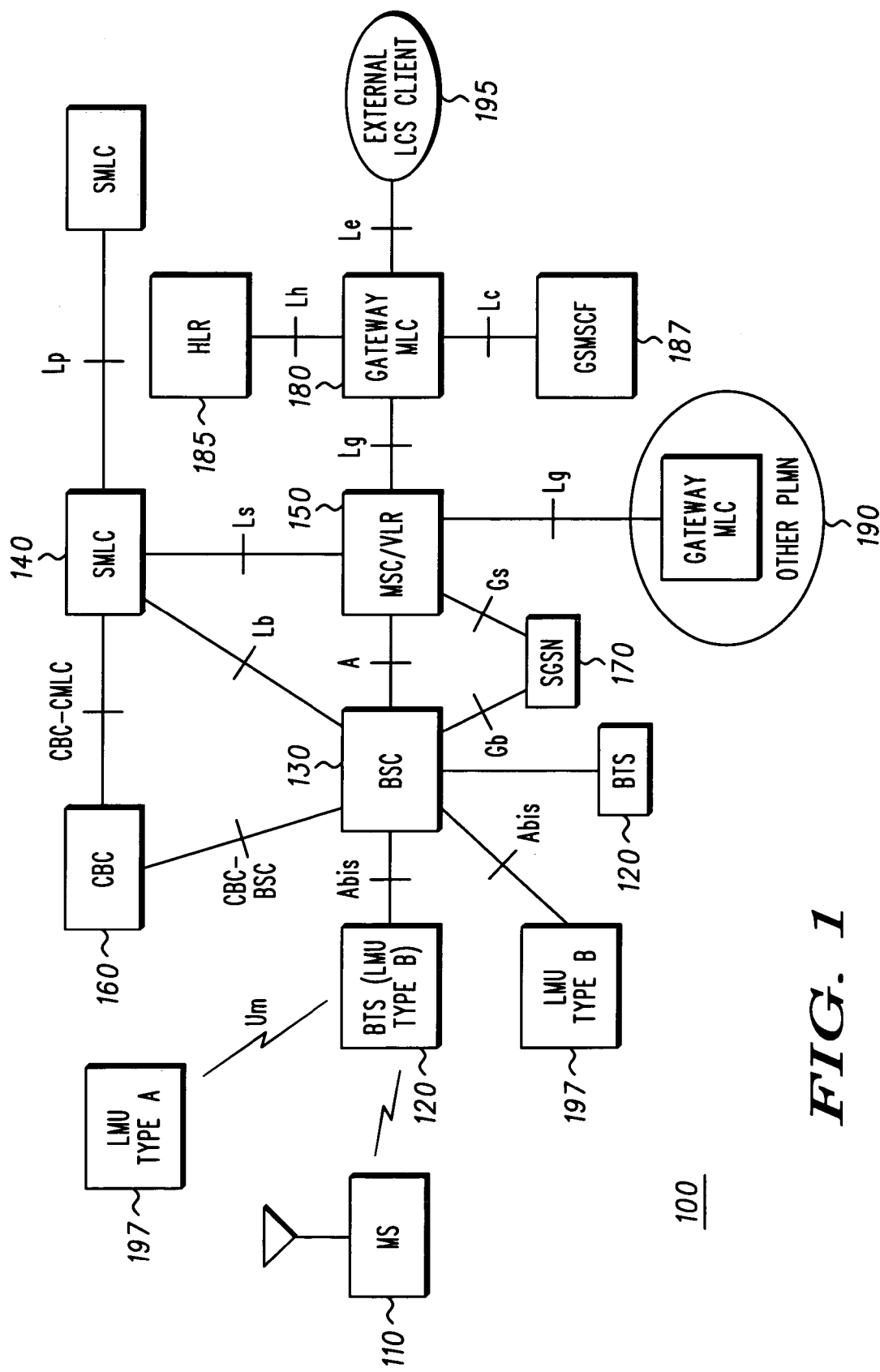
FIG. 1 is an exemplary wireless communications network.

FIG. 1 illustrates an exemplary wireless communications network in the form of a Global System For Mobile communications (GSM) network 100 supporting wireless communications for mobile wireless communication devices, for example, mobile station (MS) 110, also referred to herein as a mobile wireless communications device or as user equipment.

The mobile wireless communications device may be a wireless cellular telephone, or a two-way pager, or a wireless enabled personal digital assistant (PDA) or notebook or laptop computer, or some other radio communications device, anyone of which may be a cellular communications service subscriber device, or subscriber terminal.

The exemplary network 100 comprises generally a plurality of base-station transceivers (BTS) 120 that communicate with a base station controller (BSC) 130, which communicates with a Serving Mobile Location Center (SMLC) 140, a Mobile Switching Center/Visitor Location Register (MSC/VLR) 150 and a Cell Broadcast Controller (CBC) 160. The BSC and MSC/VLR are communicably coupled to a Serving GPRS Switching Node (SGSN) 170. The MSC/VLR is communicably coupled to the SMLC 140, a Gateway MLC (GMLC) 180 to GMLCs in other Public Land Mobile Networks (PLMNs), for example, PLMN 190. In FIG. 1, the gateway MLC 180 is coupled to a Home Location Register (HLR) 185, to a GSMSCF 187, and to an external Location Services (LCS) Client 195, for example, an E-911 operator. These and other aspects of GSM and other communications network architectures are known generally.

The exemplary GSM network 100 includes a plurality Location Measurement Units (LMUs) 197 which may be co-located at the BTSs or at other locations in the network for supporting Enhanced Observed Time Difference (E-OTD) GSM Location Services (LCS) and possibly other location technologies. The exemplary GSM communications network may also support other location services as specified, for example, in GSM 04.35, Broadcast Network Assistance For E-OTD and Global Positioning System (GPS) Methods.

Generally, Location Services (LCS) architectures compute location either at the network or at the mobile station. In MS-assisted LCS architectures, location is determined at the network, for example, at the SMLC, with information received from the mobile station. In MS-based location architectures, location is computed at the mobile station, with or without information received from the network. The mobile station location fix or information is then communicated to the requestor or other destination. Location requests may originate from within the network, for example, from a network location server, like an SMLC or from an external client, for example, from E-911 centers, indicated as LCS Client 195 in FIG. 1.

The GSM communications network architecture of FIG. 1 is only exemplary and not intended to limit the invention. The inventions apply more generally to all communications networks that provide or support location services, including, for example, 3rd Generation (3G) Universal Terrestrial Radio Access Network (UTRAN), 4th Generation communications networks and among other existing and future communications network and systems. These and other networks may support E-OTD and other location services including, for example, Global Positioning System (GPS) and other satellite positioning system location services, as well as network based location services, for example, Time of Arrival (TOA), Time Difference of Arrival (TDOA) among other location determination schemes, including fused location schemes, or combinations thereof.

Figure 2:
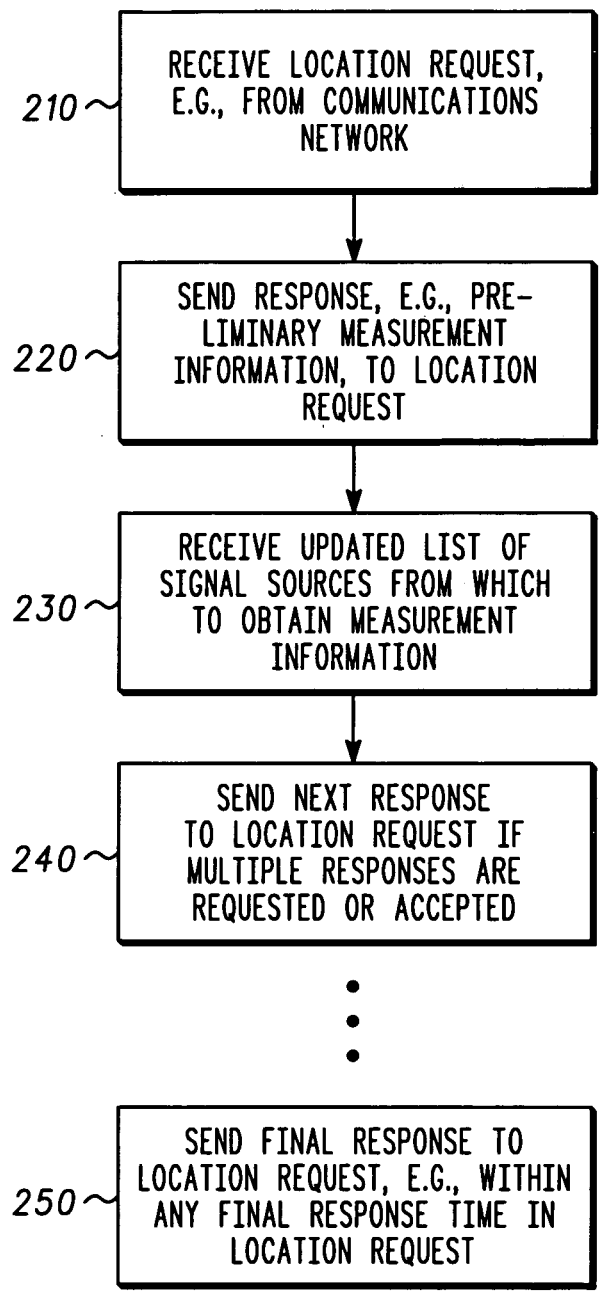
FIG. 2 is an exemplary process flow diagram for sending multiple responses in reply to a location request.

In the exemplary process flow diagram 200 of FIG. 2, at block 210, according to one aspect of the disclosure, a mobile station receives a location request from a network. The location request may be generated in response to an E-911 call initiated by the mobile station, although in other applications the location request may be prompted by some other inquiry from the mobile station, for example, in response to a request by the mobile station for location-based services. Alternatively, the location request may originate from the network, for example, the request may be initiated by an application or by a third party trying to locate the mobile station.

In some applications, the network location request is for measurement information obtained or processed by the mobile station. The network, for example, a network location server, may use the measurement information to compute the location of the mobile station. In some applications, the mobile station sends a response based upon measurement information to the network without processing the information. In other applications, the mobile station processes the measurement information before sending the response to the network. The mobile station may, for example, average measurements, or compute one or more pseudoranges between the mobile station and one or more corresponding signal sources, or the mobile station may compute its location fix. The response to the location request may thus be based upon partially or completely processed measurement information, or it may be unprocessed measurement information.

The mobile stations generally obtain measurement information from one or more signals transmitted from corresponding signal sources, for example, from corresponding cellular base stations and other terrestrial sources, and from non-terrestrial sources including space vehicles in satellite positioning and communications systems. Exemplary measurement information includes Enhanced Observed Time Difference (E-OTD) timing information, Time of Arrival (TOA) information, Time Difference of Arrival (TDOA) information, and pseudorange measurements based upon signals transmitted from corresponding space vehicles of a satellite positioning system or other signal sources, among other information.

In FIG. 2, at block 220, the mobile station sends a response to the network location request. In some applications, the mobile station sends multiple responses, for example, at least two responses, to the network in response to the network location request. In other applications, however only a single response is sent to the network. In some instances, for example, only a single response is required. In other instances, the network sends a new or updated location request before the mobile station sends more than one response to the first location request, as discussed more fully below.

In some applications, the response is based upon measurement information obtained from one or more signal sources. For example, the response maybe based upon multiple measurements made on a signal from a single source. Alternatively, the response may be based upon multiple measurements made on multiple signals from corresponding signal sources, examples of which are discussed more fully below.

In some applications, the first response to the location request is preliminary response based upon information obtained by the mobile station prior to receipt of the location request or based upon information obtained after the location request is received. In some embodiments, the preliminary response is based upon measurement information obtained from or on signals from sources other than those specified in the location request, for example, on cells other than those identified in a location assistance cell list provided in the location request.

In other applications, the preliminary response is based upon rough timing information, for example, on ¼ bit handover timing measurements obtained from cells or other signal sources to which the mobile station is synchronized for handovers. In other embodiments, the preliminary response includes a mobile station location fix obtained by or computed at the mobile station, for example, a location fix computed prior to receipt of the location request. In other embodiments, the first response is based upon information obtained from signal sources specified in the location request. Responses based upon information obtained by the mobile station prior to receipt of the location request may be sent immediately upon receipt of the request.

In FIG. 2, at block 230, in applications where the network location request specifies sources from which information is to be obtained by the mobile station, the network may send an updated list of signal sources from which to obtain measurement information based upon the preliminary response. In some embodiments, the updated list is sent as part of a new or updated location request. In other embodiments the updated list does not include a new request.

In FIG. 2, at block 240, in embodiments where the mobile station sends multiple responses to the location request, the mobile station sends a subsequent response. In applications where the network does not send an updated signal source list, the next response referenced at block 240 may be based upon a signal source list provided in the initial location request.

In applications where the mobile station receives an updated signal source list from the network, the next response from the mobile station, referenced at block 240, may or may not be based upon measurement information obtained using the updated signal source list. For example, upon receipt of an updated list, the mobile station may begin taking new measurements on signal sources in the new list and disregard previous measurements. Alternatively, if the mobile station has nearly completed obtaining information for inclusion in the next response when the updated signal source list arrives, the mobile station may disregard the new signal source list until after sending the next response.

In embodiments where the response at block 220 is based upon a measurement information set, the response at block 240 is also likely based upon a measurement information set, although the responses at blocks 220 and 240 may have been made on different signal sources.

In some embodiments, the mobile station sends multiple responses to the network in response to a command or instruction in the network location request for multiple responses. In one embodiment, the location request includes a multiple response command field, which instructs the mobile station to send multiple responses to the location request. The request may indicate that the network accepts multiple responses sent by the mobile station, or it may indicate the multiple responses are mandatory. Also, the request may specify how many responses the mobile station may or must send to the network. The request may also provide a temporal framework for when the responses should be sent.

Figure 3:
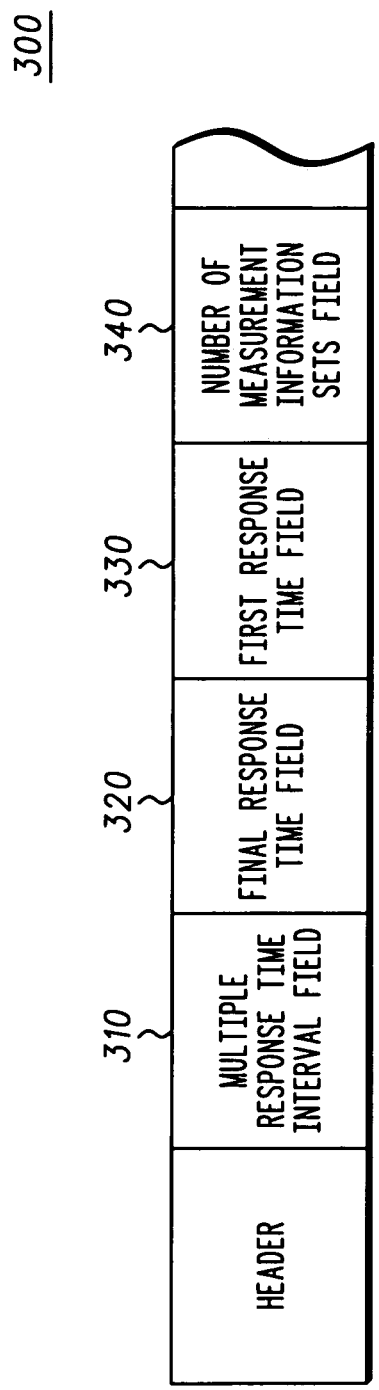
FIG. 3 is an exemplary network location request message.

In FIG. 3, an exemplary location request message includes a multiple response time interval field 310 specifying the time period or the maximum time period that may lapse between communicating multiple responses from the mobile station in response to a location request. In one exemplary embodiment, suitable for E-OTD measurement location request applications, the multiple response time interval is specified in seconds represented by $2^N$, where N is the value of the field, e.g., N=0, 1, 2, 3, etc. Exemplary intervals are 1, 2, 4, or 8 seconds.

In FIG. 3, the location request also includes preferably a final response time field 320 specifying the maximum time that may elapse before sending the last or final response. In one exemplary embodiment, suitable for E-OTD measurement location request applications, the final response time is specified in seconds represented by $2^N$, where N is the value of the field, e.g., N=0, 1, 2, 3, etc. Exemplary final response times are 1, 2, 4, 8, 16, 32, 64, or 128 seconds. The final response time field may be included in embodiments where the network location request includes a multiple response time interval field.

In some embodiments, the request includes a response time, within which at least one response from the mobile station must be sent. Thus in embodiments where the network accepts multiple responses, the mobile station must send multiple responses before the response time specified in the location request.

In FIG. 2, at block 250, a final response is sent from the mobile station to the network within a response time, or within a final response time, specified in the location request. Also, generally, the network may send the mobile station an updated signal source list from which it prefers that the mobile station obtain measurement information, for example, an updated assistance cell list in E-OTD applications. The updated signal source list may be based upon any one or more of the multiple responses received from the mobile station, for example, based upon the response at blocks 220 or 240 in FIG. 2. As discussed, the updated signal source list may be standalone information or it may be packaged with an updated location request or other information.

In some applications, the mobile station includes an indication that a response is a final response, for example, where multiple responses are sent in reply to a location request.

In FIG. 3, in some embodiments, the network location request includes an initial response time field 330 specifying the maximum time that may elapse before the mobile station sends the initial or first response, for example, where multiple responses are accepted or required. In one embodiment, the initial response field may be set with a "0" or a "1" bit. A "0" bit may indicate that a response must be sent immediately upon receipt of the location request. For an immediate response, the mobile station may send a preliminary response based, for example, upon rough timing information obtained for handover purposes, or based on other preliminary information including location computations. A "1" bit may indicate that the maximum response time is some other value, for example, the value of a multiple response time interval divided by the number of intervals specified.

Figure 4:
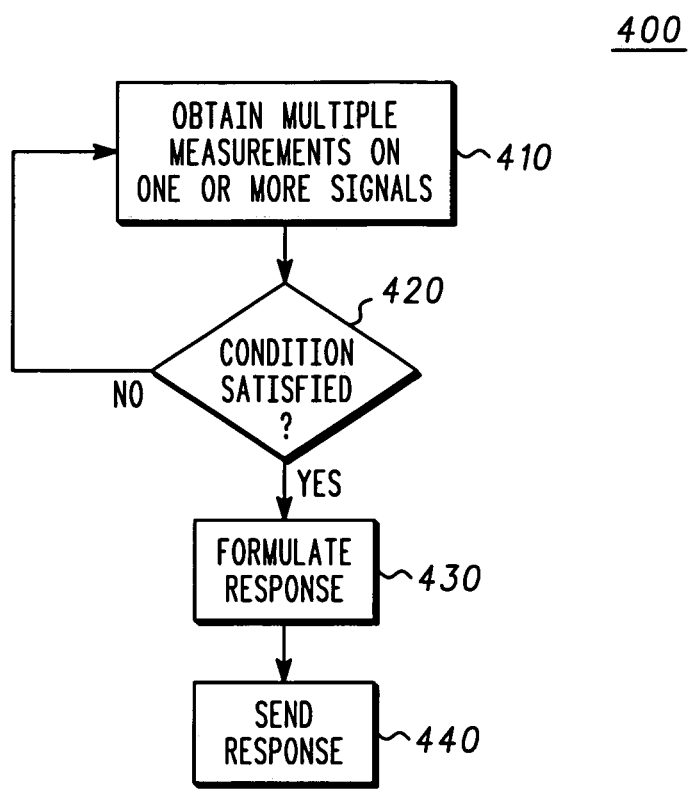
FIG. 4 is an exemplary process flow diagram for obtaining multiple measurements on one or more signals and sending a response based upon the multiple measurements.

In the process flow diagram 400 of FIG. 4, at block 410, measurement information is obtained by taking multiple measurements on one or more signal sources, for example, the acquisition of E-OTD timing and other information from corresponding signal sources. In one mode of operation, at block 420, multiple signal measurements are made on the one or more signals, and at block 430 the measurement information used to formulate at least a partial response to the location request upon satisfying a condition. In one embodiment, the response is at least partially formulated when a variance of the multiple measurements satisfies a condition. In another embodiment, the response is at least partially formulated when a rate of change of standard deviation of the multiple measurements on the signal satisfies a condition. The condition may be a threshold, determined based upon empirical data or other information. At block 440, a response based upon the measurement information is sent to the network.

In one embodiment, the mobile station obtains measurement information by taking multiple measurements on a plurality of at least two signals from corresponding signal sources. A response, based on the plurality of signal measurements, is sent in reply to the location request when a variance of multiple measurements on each of the plurality of signals satisfies a condition or when a rate of change of standard deviation of multiple measurements on each of the plurality of signals satisfies a condition.

In one embodiment, the mobile station includes multiple measurements information sets in a response to a location request, wherein each measurement information set is based on measurement information obtained from multiple signal sources. In one embodiment, the mobile station formulates a measurement information set when the variance or rate of change of standard deviation of multiple measurements on each of the signals measured satisfies a condition. Alternatively, a measurement information set may be formulated upon obtaining a specified number of acceptable measurements on each signal measured. Generally several measurement information sets are formulated, from measurements made on multiple signals, and stored prior to transmission in the response.

Figure 5:
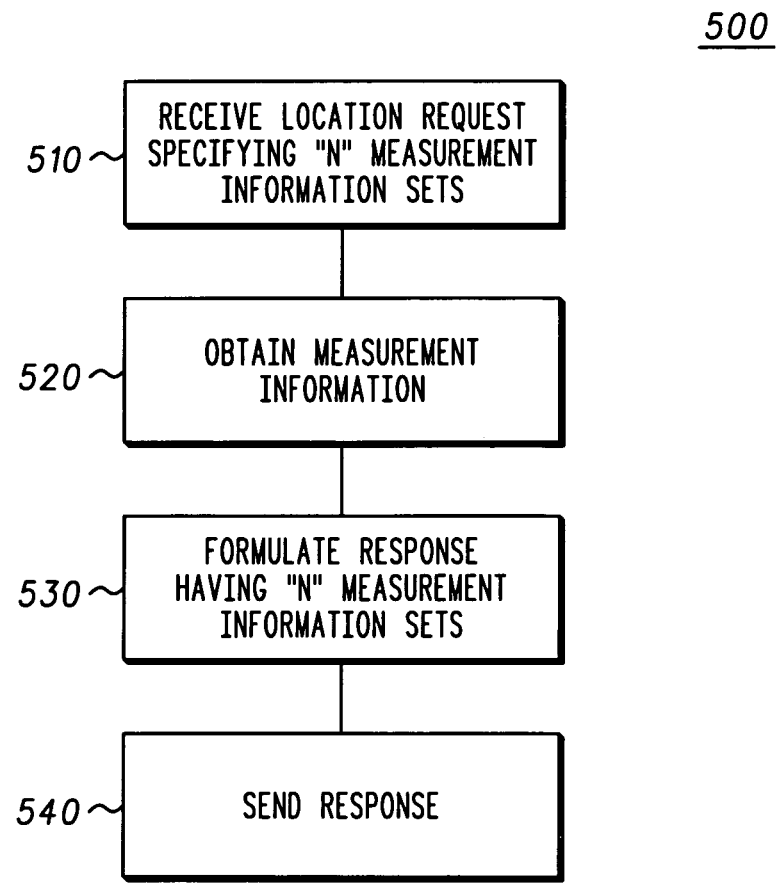
FIG. 5 is an exemplary process flow diagram for sending multiple measurement information sets in response to a location request.

In FIG. 5, at block 510, the mobile station receives a location request specifying that the response provide a plurality of at least two measurement information sets. At block 520, the mobile station obtains measurement information, for example, E-OTD timing information or pseudorange information, etc. At block 530, a response is formulated having multiple information sets based upon the measurement information. At block 540, the mobile station sends the response based upon or including the measurement information sets obtained or formulated.

In FIG. 3, the location request 300 includes a field 340 that specifies the minimum number of measurement information sets that must be sent in each response. In some embodiments, the number of sets field is inapplicable to the first response in applications requiring multiple responses, for example, where an immediate first response is requested. In one exemplary embodiment, the minimum number of sets field is N+2, where N is the value of the field having an exemplary range between 0 and 1.

In some embodiments, the location request specifies measurement information set interval information, for example, the maximum time interval that may elapse between measurement information sets. In these embodiments, preferably, the mobile station must obtain measurement information sets at intervals not later than the intervals specified in the network location request. In FIG. 3, the field 340 may alternatively specifies the measurement information set interval with or without specifying the number of measurement information set required.

While the present disclosure and what is presently considered to be the best mode or modes thereof have been described sufficiently to establish possession by the inventors and to enable those of ordinary skill to make and use the same, it will be understood and appreciated that there are equivalents to the exemplary embodiments disclosed herein and that many modifications and variations may be made thereto without departing from the scope and spirit of the inventions, which are to be limited not by the exemplary embodiments but by the claims appended hereto.

What is claimed is:

1. A method in a mobile wireless communications device, the method comprising:
   receiving a network location request at the mobile wireless communications device;
   sending multiple responses to the same network location request,
   the multiple responses sent from the mobile wireless communications device;
   obtaining multiple measurement information sets;
   sending multiple responses to the same network location request includes sending the multiple measurement information sets; and
   completing each of the multiple measurement information sets when a variance of multiple measurements on a plurality of signal sources satisfies a condition.

2. A method in a mobile wireless communications device, the method comprising:
   receiving a network location request at the mobile wireless communications device;
   sending multiple responses to the same network location request,
   the multiple responses sent from the mobile wireless communications device;
   obtaining multiple measurement information sets;
   sending multiple responses to the same network location request includes sending the multiple measurement information sets; and
   completing each of the multiple measurement information sets when a rate of change of standard deviation of multiple measurements on a plurality signal sources satisfies a condition.

3. A method in a mobile wireless communications device, the method comprising:
   receiving a network location request the mobile wireless communications device; and
   sending multiple responses to the same network location request,
   the multiple responses sent from the mobile wireless communications device,
   each response including measurement information for a plurality of signal sources, and
   sending each response when a variance of multiple measurements on each signal source of the plurality of signal sources satisfies a condition.

4. A method in a mobile wireless communications device, the method comprising:
   receiving a network location request at the mobile wireless communications device; and
   sending multiple responses to the same network location request,
   the multiple responses sent from the mobile wireless communications device,
   each response including measurement information for a plurality of signal sources,
   sending each response when a rate of change of standard deviation of multiple measurements on each signal source of the plurality of signal sources satisfies a condition.

* * * * *